United States Patent
Salman et al.

(10) Patent No.: US 7,751,961 B2
(45) Date of Patent: Jul. 6, 2010

(54) ACCELERATION/DECELERATION INDUCED REAL-TIME IDENTIFICATION OF MAXIMUM TIRE-ROAD FRICTION COEFFICIENT

(75) Inventors: Mutasim A. Salman, Rochester Hills, MI (US); Sarmad Y. Hermiz, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 901 days.

(21) Appl. No.: 11/227,311

(22) Filed: Sep. 15, 2005

(65) Prior Publication Data

US 2007/0061061 A1 Mar. 15, 2007

(51) Int. Cl.
*G06F 7/00* (2006.01)
*G06F 17/00* (2006.01)

(52) U.S. Cl. ............... 701/80; 701/71; 701/72; 701/73; 701/79; 73/114.12; 303/148; 303/149; 303/151; 303/163; 303/150; 180/197

(58) Field of Classification Search ............... 701/80, 701/71, 72, 73, 79; 73/114.12; 303/148, 303/149, 151; 180/197
See application file for complete search history.

(56) References Cited

U.S. PATENT DOCUMENTS

| | | | | | |
|---|---|---|---|---|---|
| 4,664,453 | A | * | 5/1987 | Kade et al. | 303/162 |
| 4,671,579 | A | * | 6/1987 | Sawano et al. | 303/150 |
| 4,693,522 | A | * | 9/1987 | Wupper et al. | 303/150 |
| 4,947,332 | A | * | 8/1990 | Ghoneim | 701/84 |
| RE33,557 | E | * | 3/1991 | Kade et al. | 303/162 |
| 5,063,514 | A | * | 11/1991 | Headley et al. | 701/73 |
| 5,275,475 | A | * | 1/1994 | Hartmann et al. | 303/146 |
| 5,332,300 | A | * | 7/1994 | Hartmann et al. | 303/146 |
| 5,341,297 | A | * | 8/1994 | Zomotor et al. | 701/72 |
| 5,371,677 | A | * | 12/1994 | Ehret et al. | 701/72 |
| 5,387,031 | A | * | 2/1995 | Watanabe | 303/171 |
| 5,413,405 | A | * | 5/1995 | Okazaki | 303/150 |
| 5,428,532 | A | * | 6/1995 | Yasuno | 701/48 |
| 5,470,136 | A | * | 11/1995 | Tozu et al. | 303/147 |
| 5,480,219 | A | * | 1/1996 | Kost et al. | 303/146 |
| 5,551,771 | A | * | 9/1996 | Akuzawa et al. | 303/186 |
| 5,586,028 | A | * | 12/1996 | Sekine et al. | 701/1 |
| 5,588,721 | A | * | 12/1996 | Asano et al. | 303/163 |
| 6,023,649 | A | * | 2/2000 | Matsuura et al. | 701/71 |

(Continued)

OTHER PUBLICATIONS

Gustafsson, F., "Slip-based Tire-Road Friction Estimation", Automatica, vol. 33, No. 6, pp. 1067-1099, 1997. 1997 Elsevier Science Ltd. Printed in Great Britain.*

(Continued)

*Primary Examiner*—Khoi Tran
*Assistant Examiner*—Jorge O Peche
(74) *Attorney, Agent, or Firm*—John A. Miller; Miller IP Group, PLC

(57) ABSTRACT

A method for classifying a road surface condition by estimating the maximum tire/road surface coefficient of friction and actively inducing acceleration or deceleration. In one embodiment, the induced acceleration/deceleration is provided by applying torque to the driven wheels of the vehicle. The speeds of the driven and non-driven wheels are measured. The tire/road surface coefficient of friction and the driven wheel slip ratio are calculated from the wheel speeds. The tire/road surface coefficient of friction and the wheel slip ratio are used to determine the slope of the wheel slip/coefficient of friction curve, which is used to classify the road surface condition.

21 Claims, 3 Drawing Sheets

U.S. PATENT DOCUMENTS

| | | | | |
|---|---|---|---|---|
| 6,094,614 | A * | 7/2000 | Hiwatashi | 701/89 |
| 6,324,461 | B1 * | 11/2001 | Yamaguchi et al. | 701/80 |
| 6,662,097 | B2 * | 12/2003 | Kin et al. | 701/80 |
| 6,697,728 | B2 * | 2/2004 | Kin et al. | 701/70 |
| 6,802,226 | B2 * | 10/2004 | Ono et al. | 73/862.325 |
| 7,561,954 | B2 * | 7/2009 | Aizawa et al. | 701/79 |
| 2003/0051560 | A1 * | 3/2003 | Ono et al. | 73/862.08 |
| 2003/0074127 | A1 * | 4/2003 | Kin et al. | 701/80 |
| 2004/0204812 | A1 * | 10/2004 | Tran | 701/80 |
| 2005/0038588 | A1 * | 2/2005 | Shukla | 701/70 |
| 2005/0038589 | A1 * | 2/2005 | Shukla | 701/80 |
| 2005/0049774 | A1 * | 3/2005 | Kogure | 701/80 |
| 2005/0085987 | A1 * | 4/2005 | Yokota et al. | 701/80 |
| 2005/0102086 | A1 * | 5/2005 | Nakao | 701/80 |
| 2007/0055432 | A1 * | 3/2007 | Koibuchi et al. | 701/72 |

OTHER PUBLICATIONS

Muller, S., Uchanski, M. and Hedrick, K., "Estimation of the Maximum Tire-Road Friction Coefficient", Journal of Dynamics Systems, Measurement and Control, Dec. 2003 vol. 125 pp. 607-617.

Gustafsson, F., "Slip-based Tire-Road Friction Estimation", Automatica, vol. 33, No. 6, pp. 1067-1099, 1997. 1997 Elsevier Science Ltd. Printed in Great Britain.

* cited by examiner

ACCELERATION/DECELERATION INDUCED REAL-TIME IDENTIFICATION OF MAXIMUM TIRE-ROAD FRICTION COEFFICIENT

BACKGROUND OF THE INVENTION

1. Field of the Invention

This invention relates generally to a method for classifying a road surface condition and, more particularly, to a method for estimating the maximum tire/road surface coefficient of friction to determine if the road surface is icy, snowy or neither, where the method includes inducing a specified amount of vehicle acceleration or deceleration.

2. Discussion of the Related Art

The performance of various vehicle control systems, such as collision avoidance systems, adaptive cruise control systems, automated lane-keeping systems, automated braking systems (ABS), turning control systems (TCS), stability control systems, etc., can be greatly improved by providing an estimate of the maximum tire/road surface coefficient of friction. For example, the gains and the commanded values of the vehicle control system can be made adaptive to the maximum tire/road surface coefficient of friction to increase the performance of the system.

The wheel slip of a vehicle wheel during acceleration is defined as the difference in wheel speed between a driven wheel and a non-driven wheel. The wheel slip ratio is the ratio of the difference between the speeds of the driven wheel and the non-driven wheel to the speed of the driven wheel. It can be shown that the slope of the wheel slip ratio road surface coefficient of friction curves for small slip ratios (in the linear region) is almost the same for all road surfaces. FIG. 1 is a graph with wheel slip ratio on the horizontal axis and coefficient of friction on the vertical axis showing wheel slip curves for different road conditions that illustrates this point. Graph line 42 is a wheel slip ratio curve for a dry road condition, graph line 44 is a wheel slip ratio curve for a wet road condition, graph line 46 is a wheel slip ratio curve for a snowy road condition and graph line 48 is a wheel slip ratio curve for an icy road condition.

It is typically difficult to classify the road surface condition when the wheel slip ratio is in the linear operating range. As the wheel slip ratio increases, the slope for the different road surface conditions starts to decrease and become different. However, once the vehicle region of operation is in the non-linear region, it may be too late for the control system to utilize the wheel slip information and adapt to the current road surface conditions. Therefore it is desirable to estimate the maximum tire/road surface coefficient of friction before the wheel slip ratio reaches the value that corresponds to the maximum coefficient of friction. By estimating the slope of the curve at higher wheel slip ratios, it is possible to classify the road surfaces as, for example, icy, snowy, wet or dry.

SUMMARY OF THE INVENTION

In accordance with the teachings of the present invention, a method for classifying a road surface condition by estimating the maximum a tire/road surface coefficient of friction is disclosed that includes actively inducing a specified amount of vehicle acceleration or deceleration. In one embodiment, the induced acceleration/deceleration is provided by applying torque to the driven wheels of the vehicle. The speeds of the driven and non-driven wheels are measured. The tire/road surface coefficient of friction and the driven wheel slip ratio are calculated from the wheel speeds. The tire/road surface coefficient of friction and the wheel slip ratio are used to determine the slope of the wheel slip/coefficient of friction curve, which is used to classify the road surface condition.

Additional features of the present invention will become apparent from the following description and appended claims taken in conjunction with the accompanying drawings.

DETAILED DESCRIPTION OF THE EMBODIMENTS

The following discussion of the embodiments of the invention directed to a method for classifying a road surface condition by estimating the maximum tire/road surface coefficient of friction and inducing a vehicle acceleration/deceleration is merely exemplary in nature, and is in no way intended to limit the invention or its applications or uses.

The present invention includes a method for classifying road surface conditions, such as wet, icy, snowy or dry, by estimating the maximum tire/road surface coefficient of friction and the wheel slip ratio. In one embodiment, an induced vehicle acceleration/deceleration is applied to the vehicle and the wheel slip ratio and the tire/road surface coefficient friction are estimated and used to calculate the slope of the wheel slip ratio curve to classify the road condition.

Figure 2:
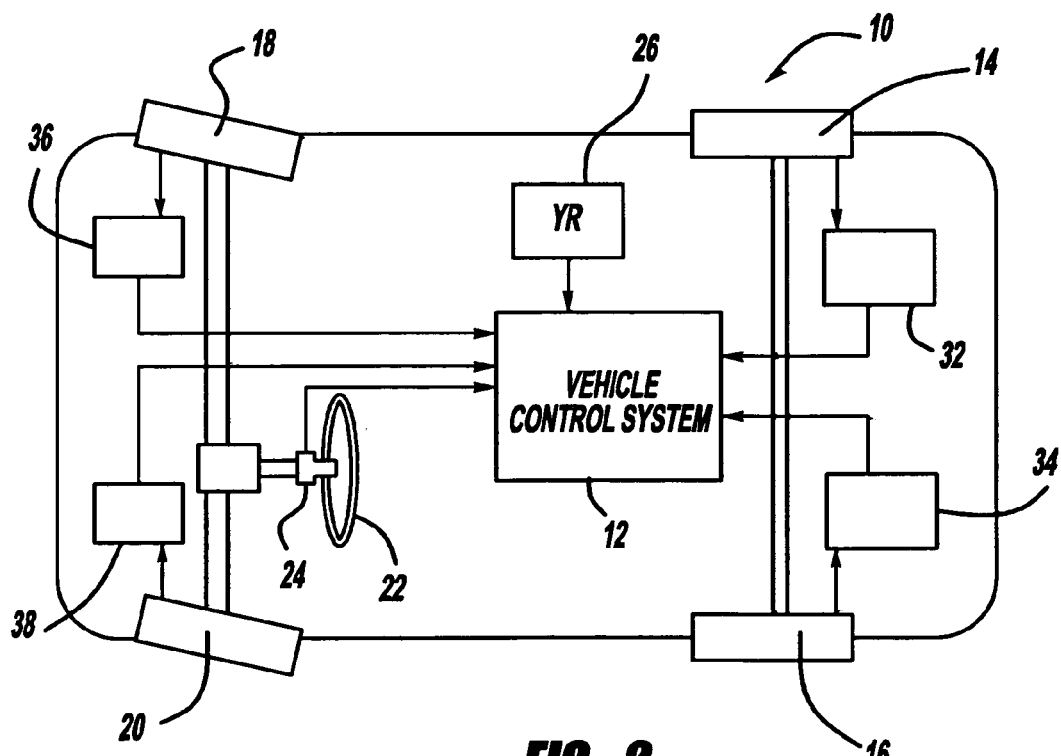
FIG. 2 is a plan view of a vehicle including a vehicle control system employing a method for estimating the maximum tire/road surface coefficient of friction to determine the road surface condition, according to an embodiment of the present invention.

FIG. 2 is a plan view of a vehicle 10 including a vehicle control system 12, such as a collision avoidance system, an adaptive cruise control system, an automated lane-keeping system, an automated braking system, a turning control system, a stability control system, etc. The vehicle 10 includes rear wheels 14 and 16 and front wheels 18 and 20. A hand-wheel 22 is used to steer the front wheels 18 and 20, and a hand-wheel angle sensor 24 measures the angle of the hand-wheel 22 to provide the road wheel angle. A yaw rate sensor 26 measures the yaw rate of the vehicle 10. Further, wheel speed sensors 32, 34, 36 and 38 measure the rotational speed of the wheels 14, 16, 18 and 20, respectively. The vehicle control system 12 receives signals from each of the hand-wheel angle sensor 24, the yaw rate sensor 26, and the wheel speed sensors 32, 34, 36 and 38 for reasons that will become apparent from the discussion below.

Figure 3:
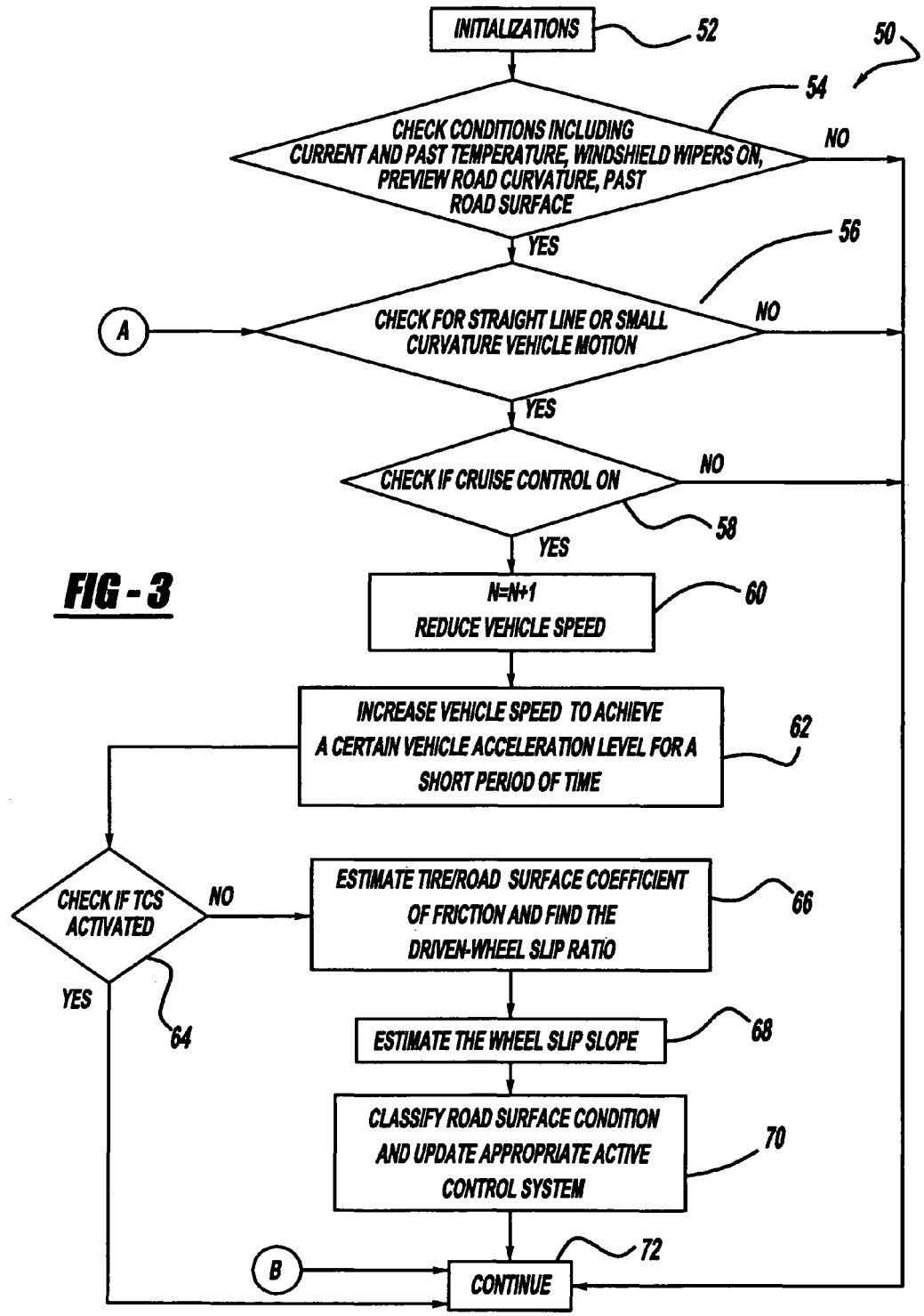
FIG. 3 is a flow chart diagram showing a method for determining the road surface condition by inducing a specified amount of vehicle acceleration or deceleration, according to an embodiment of the present invention.

FIG. 3 is a flow chart diagram 50 showing a method for classifying the road surface condition by estimating the maximum tire/road surface coefficient of friction and the wheel slip ratio, according to an embodiment of the present invention. The flow chart 50 determines whether the road surface is icy or snowy, however, the same approach can be used for other road conditions, such as wet and dry road conditions. The algorithm is initialized at box 52, where time, counters and thresholds are defined.

Next, the algorithm determines whether the conditions are proper for estimating the tire/road surface coefficient of friction, and if so, how often it will be done at box 54. These conditions include, but are not limited to, measuring the outside ambient temperature, determining whether the windshield wipers are on, determining the proportion of time the road has been classified as icy or snowy, determining the past road surface condition, and previewing the road curvature. For example, it is not necessary to determine whether the road condition is icy or snowy if the ambient air temperature has been above freezing for a significant period of time. Also, it is desirable to determine whether the vehicle will be traveling around a curve in the near future, where icy and snowy conditions may be more dangerous. In one embodiment, the system uses maps and GPS to anticipate whether the vehicle will be traveling around a significant turn in the near future so that this information can be used in the calculation process. The operation of this step of the process will be discussed in more detail below with reference to FIG. 4.

Next, the algorithm determines whether the vehicle 10 is traveling in a straight line or a slight curvature at decision diamond 56. This test can be done by measuring the handwheel angle and the yaw rate using the sensors 24 and 26, and comparing the measurements to predetermined thresholds. It is necessary that the algorithm know whether the vehicle 10 is traveling on a relatively sharp curve because the calculation values for this vehicle motion will be different than for a straight line or small curvature vehicle motion. Particularly, if there are high lateral forces, the tire/road characteristics will change. Thus, if the vehicle 10 is traveling around a sharp curve, then the algorithm will not perform the calculations to estimate the tire/road surface coefficient of friction.

The algorithm then determines whether the cruise control is on at decision diamond 58. Because the method for determining the road surface condition of the invention causes the vehicle 10 to accelerate and/or decelerate a slight amount, it may be desirable that the method only be used if the cruise control is on because otherwise the slight acceleration or deceleration could be an annoyance to the vehicle operator. Small adjustments in vehicle acceleration are performed by the cruise control anyway, so the vehicle operator would not know the difference between the: cruise control operation and the method for determining the road surface condition of the invention.

If the cruise control is on at the decision diamond 58, then the vehicle speed is reduced at box 60 to prepare for an increase in acceleration to estimate the tire/road surface coefficient of friction. The vehicle speed is first reduced so that there is not an increase in speed of the vehicle that may otherwise be a safety issue. A counter (N) is also incremented at this step. The vehicle speed is then increased at box 62 to provide a vehicle acceleration for a short period of time. The amount of speed reduction at the box 60 should be small enough so as not to be noticed by the vehicle operator, such as two kilometers per hour. If the vehicle 10 includes a traction control system (TCS), the algorithm determines whether the TCS has been activated at box 64. If the TCS is activated, then the road surface condition can be classified based on TCS activation information, and there is no need to continue with the estimation process of the invention.

The following discussion provides one non-limiting embodiment of how much acceleration is required to estimate the tire/road-surface coefficient of friction for a front-wheel drive vehicle. First, assume a front-wheel drive vehicle and a straight-line motion. The vehicle motion can be described as:

$$ma_x = \mu^* N_F \quad (1)$$

Where m is the mass of the vehicle 10, a is the acceleration of the vehicle 10, $\mu$ is tire/road surface coefficient of friction and $N_F$ is a normal force at the front of the vehicle10.

From a vehicle free-body diagram, the normal force $N_F$ at the front of the vehicle 10 can be computed as:

$$N_F = (mgb - ma_x h)/L \quad (2)$$

Where g is the gravitational constant, b is the distance between the center of gravity of the vehicle 10 and the rear wheels, h is the distance between the center of gravity of the vehicle 10 and the road surface, and L is the wheel base of the vehicle 10.

Simultaneously solving equations (1) and (2)-gives:

$$a_x = \frac{\mu g b / L}{(1 + \mu h / L)} \quad (3)$$

To provide for an estimate of the maximum tire/road surface coefficient of friction $\mu_{max}$, a certain amount of vehicle acceleration needs to be achieved. In this embodiment, icy and snowy road conditions are of interest. To test for snowy or icy road conditions, a vehicle acceleration of 1.031 m/sec² is needed. The values are based on typical vehicle parameters, such as b=1.58, h=0.5991 and L=2.885. The 1.031 m/sec² acceleration value is equivalent to an increase of vehicle speed of 0.515 m/sec in 0.5 seconds.

Once the target speed is achieved, the induced acceleration is terminated. While the acceleration is being induced, the driven wheel slip ratio $S_f$ and the tire/road surface coefficient of friction $\mu$ are calculated from the front and rear wheel speed-measurements provided by the sensors 32-38 at box 66. The wheel slip ratio $S_f$ at the front wheels of the vehicle 10 can be calculated as:

$$S_f = (w_f R_f - w_r R_r)/w_f R_f \quad (4)$$

Where $w_f$ is the wheel speed of the front wheels 18 and 20 of the vehicle 10, $R_f$ is the radius of the front wheels 18 and 20, $w_r$ is the wheel speed of the rear wheels 14 and 16 of the vehicle 10 and $R_r$ is the radius of the rear wheels 14 and 16 of the vehicle.

The tire/road surface coefficient of friction $\mu$ can be computed using the equation:

$$\mu = \frac{w_r R_r}{(gb - hw_r R_r)/L}. \quad (5)$$

The slope k of the wheel slip ratio is estimated at box 68 using any of the well known estimation methods, such as lease squares. One of the advantages of the induced acceleration method of the invention is the sufficient excitation of the system that leads to good estimation results. The following linear regression equation can be used in the estimation calculation.

$$S = \frac{1}{k}\mu + \delta \quad (6)$$

Figure 1:
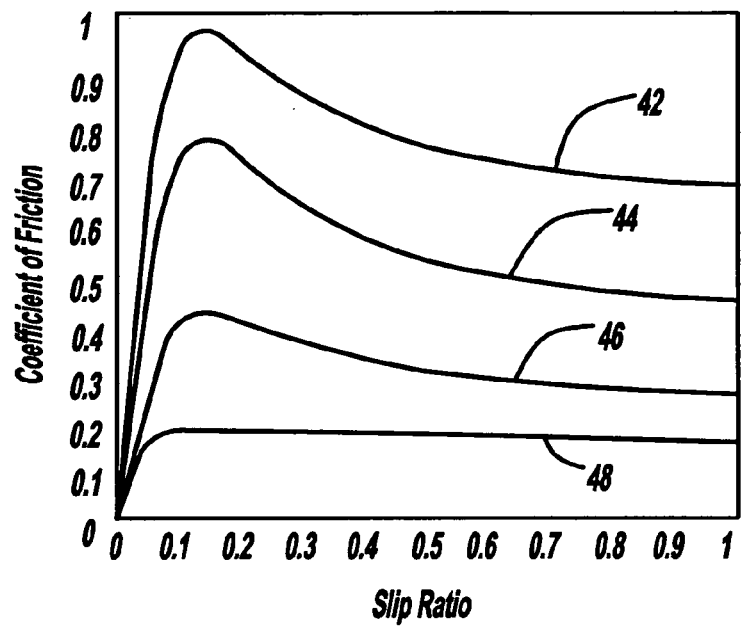
FIG. 1 is a graph with wheel slip ratio on the horizontal axis and coefficient of friction on the vertical axis showing wheel slip ratio curves for different road conditions, including an icy, snowy, wet and dry road condition.

The values of $S_f$ and μ are computed from equations (4) and (5), and are used in equation (6) to estimate the slope k of the wheel slip ratio curve. The value δ is a constant. Depending on the value of the slope k, the wheel slip ratio curve is used to classify the road condition at box 70 in FIG. 1. The algorithm then continues at box 72.

Figure 4:
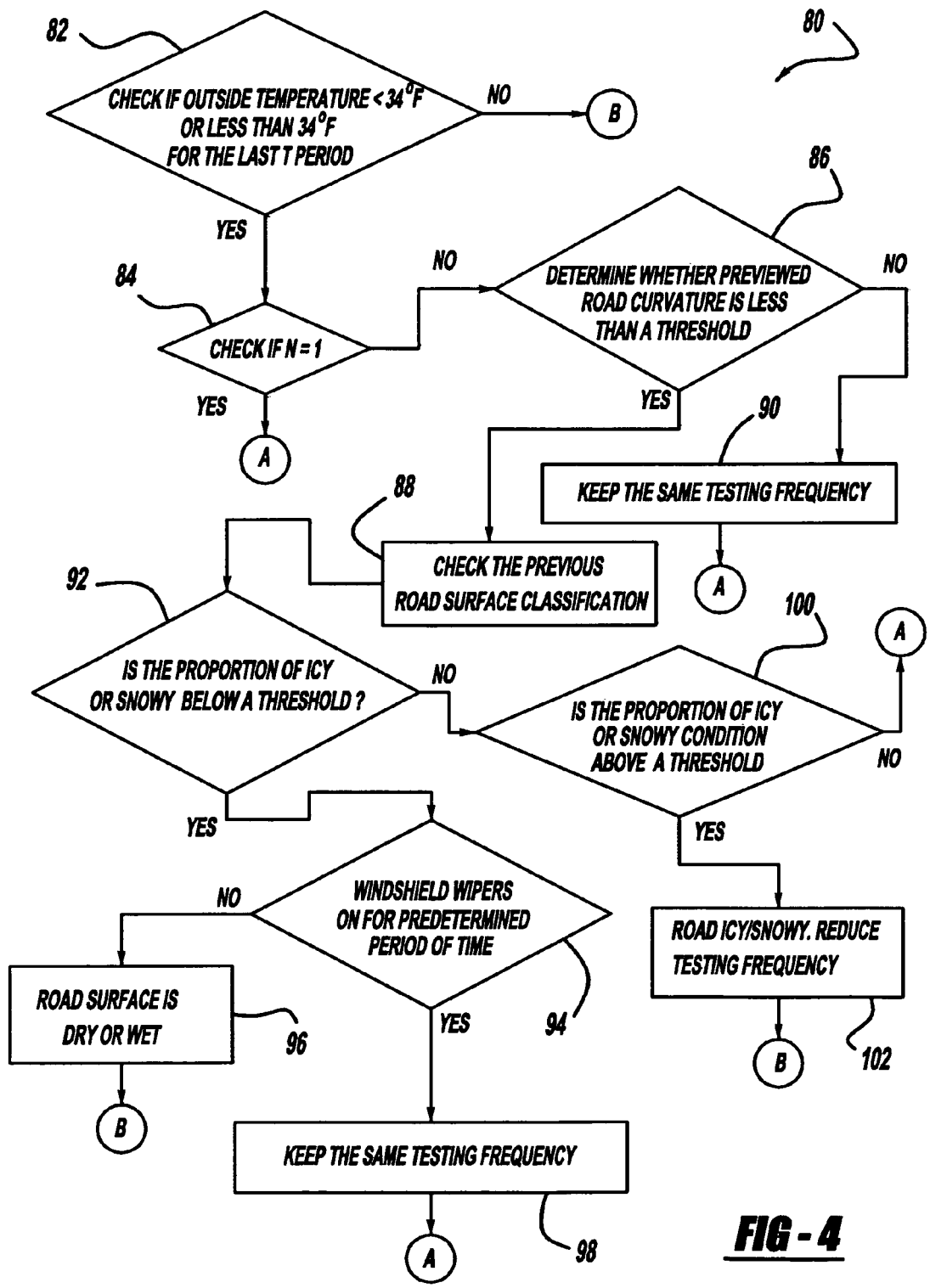
FIG. 4 is a flow chart diagram showing a method for checking certain vehicle conditions to determine whether the method for determining the road surface condition will be initiated and at what frequency, according to an embodiment of the present invention.

FIG. 4 is a flow chart diagram 80 showing a detailed discussion of checking the vehicle conditions to determine if the road surface will be classified, and if so, how often at the box 54. The algorithm determines whether the outside air temperature is less than 34° F., or is higher than 34° F., but for less than time T, at box 82. The value 34° F. is by way of a non-limiting example in that other systems may use other temperatures. If the outside temperature is not less than 34° F. and has been greater than 34° F. for longer than time period T, then the algorithm goes to the continue box 72 because the road surface condition determination is not necessary because the temperature is too warm for icy or snowy road conditions.

If the air temperature is less than 34° F. or it is higher than 34° F., but not for a long enough time period, then the algorithm determines whether it is the first calculation period N (start-up) at decision diamond 84. If N is equal to 1 at the decision diamond 84 indicating the first calculation period, then the algorithm goes directly to the box 56. If N is not equal to 1, then the algorithm determines whether a previewed road curvature is less than a predetermined threshold at box 86. As discussed above, the process of determining the estimated tire/road surface coefficient of friction is not performed if the curvature of the road is greater than a predetermined value. That value can be any value suitable for a particular vehicle consistent within discussion herein. If the previewed road curvature is not less than the predetermined threshold, then the algorithm keeps the same testing frequency for classifying the road surface condition at box 90 and goes to the box 56. If the road curvature is less than the predetermined threshold, the previous classification of the road is checked at box 88.

The algorithm then determines if the proportion of time that the road surface has been classified as icy or snowy is less than a predetermined threshold at decision diamond 92. If the proportion time that the road surface has been classified as icy or snowy is less than the predetermined threshold, than the algorithm knows that there is not much ice or snow on the road, if any. If the proportion is below the threshold at the decision diamond 92, then the algorithm determines whether the windshield wipers have been on for a predetermined period of time at decision diamond 94. If the windshield wipers have not been on for the predetermined period of time at the decision diamond 94, then the algorithm determines that the road surface is dry or wet at box 96, and continues at the box 72. If the windshield wipers have been on for the predetermined period of time, then the algorithm keeps the same testing frequency at box 98 and then goes to the box 56.

If the proportion of icy or snow conditions is above the threshold at the decision diamond 92, where some ice or snow is present, then the algorithm determines if the proportion of icy or snow conditions is above a predetermined threshold at decision diamond 100. If the proportion of icy or snowy conditions is not above the threshold at the decision diamond 100, then the algorithm goes to the box 56. Otherwise, the algorithm reduces the testing frequency at box 102 and continues at the box 72 because the algorithm already knows that the road is icy or snowy.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining a road surface condition for a vehicle, said method comprising:
   determining a plurality of operating parameters;
   determining whether the vehicle is traveling along a substantially straight line or along a curve;
   turning on a cruise control;
   changing the vehicle speed for a predetermined period of time;
   determining a tire/road surface coefficient of friction from the change in vehicle speed;
   determining a wheel slip ratio from the change in vehicle speed; and
   determining the road surface condition based on the tire/road surface coefficient of friction and the wheel slip ratio.

2. The method according to claim 1 wherein determining the road surface condition includes calculating a slope of a curve that defines a function between the tire/road surface coefficient of friction and the wheel slip ratio.

3. The method according to claim 2 wherein determining the tire/road surface coefficient of friction and the wheel slip ratio includes using the speed of wheels of the vehicle.

4. The method according to claim 3 wherein determining the tire/road surface coefficient of friction, determining the wheel slip ratio and determining the slope of the curve includes using the equations:

$$S = (wR - wR)/wR$$

$$\mu = \frac{wR}{(gb - hwR)/L}$$

$$S = \frac{1}{k}\mu + \delta$$

where w is the speed of the wheels of the vehicle, R is the radius of the wheels, S is the wheel slip ratio, μ is the tire/road surface coefficient of friction, L is the vehicle wheel base, b is the distance between the center of gravity of the vehicle and the wheels of the vehicle, h is the distance of the center of the gravity and the road surface, g is the gravitational constant, k is the slope and δ is a constant.

5. The method according to claim 1 wherein determining the wheel slip ratio includes determining the wheel slip ratio of the driven wheels of the vehicle.

6. The method according to claim 1 wherein determining the plurality of operating parameters includes determining an ambient temperature, determining whether vehicle windshield wipers are on, determining a previewed road curvature and determining a previous road surface condition.

7. The method according to claim 6 wherein determining a previewed road curvature includes using maps and GPS.

8. The method according to claim 1 wherein determining if the vehicle is traveling along a straight line or a curve includes using a yaw rate sensor and/or a hand-wheel angle sensor.

9. The method according to claim 1 wherein changing the vehicle speed includes changing the vehicle speed by about two kilometers per hour.

10. The method according to claim 1 wherein determining the road surface condition includes determining whether the road surface is icy or snowy.

11. A method for determining a road surface condition for a vehicle stability system, said method comprising: changing the speed of the vehicle;
   turning on a cruise control;
   determining a tire/road surface coefficient of friction using the change of the vehicle speed;
   determining a wheel slip ratio using the change of the vehicle speed; and
   determining a slope of a curve that defines a function of the tire/road surface coefficient of friction and the wheel slip ratio.

12. The method according to claim 11 further comprising determining the road surface condition from the slope of the curve.

13. The method according to claim 11 wherein determining the tire/road surface coefficient of friction and the wheel slip ratio includes using the speed of wheels of the vehicle.

14. The method according to claim 11 wherein determining the wheel slip ratio includes determining the wheel slip ratio of the driven wheels of the vehicle.

15. A system for determining a road surface condition for a vehicle, said system comprising:
   means for determining a plurality of operating parameters;
   means for determining whether the vehicle is traveling along a substantially straight line or along a curve;
   means for turning on a cruise control;
   means for changing the vehicle speed;
   means for determining a tire/road surface coefficient of friction from the change in vehicle speed;
   means for determining a wheel slip ratio from the change in vehicle speed; and
   means for determining the road surface condition based on the tire/road surface coefficient of friction and the wheel slip ratio.

16. The system according to claim 15 wherein the means for determining the road surface condition includes means for calculating a slope of a curve that defines a function between the tire/road surface coefficient of friction and the wheel slip ratio.

17. The system according to claim 15 wherein the means for determining the tire/road surface coefficient of friction and the wheel slip ratio uses the speed of wheels of the vehicle.

18. The system according to claim 15 wherein the means for determining the wheel slip ratio determines the wheel slip ratio of the driven wheels of the vehicle.

19. The system according to claim 15 wherein the means for determining the plurality of operating parameters includes means for determining an ambient temperature, means for determining whether vehicle windshield wipers are on, means for determining a previewed road curvature and means for determining a previous road surface condition.

20. The system according to claim 19 wherein the means for determining a previewed road curvature uses maps and GPS.

21. The system according to claim 15 wherein the means for determining if the vehicle is traveling along a straight line or a curve includes using a yaw rate sensor and/or a hand-wheel angle sensor.

* * * * *